US010202205B2

(12) United States Patent
Schoen et al.

(10) Patent No.: US 10,202,205 B2
(45) Date of Patent: Feb. 12, 2019

(54) EXTERIOR AIRPLANE LIGHT UNIT AND METHOD OF WARNING GROUND PERSONNEL

(71) Applicant: Goodrich Lighting Systems GmbH, Lippstadt (DE)

(72) Inventors: Christian Schoen, Mainz (DE); Andre Hessling-Von Heimendahl, Koblenz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/680,295

(22) Filed: Aug. 18, 2017

(65) Prior Publication Data
US 2018/0050821 A1 Feb. 22, 2018

(30) Foreign Application Priority Data

Aug. 19, 2016 (EP) .................................. 16185045

(51) Int. Cl.
*B64D 47/06* (2006.01)

(52) U.S. Cl.
CPC .......... *B64D 47/06* (2013.01); *B64D 2203/00* (2013.01)

(58) Field of Classification Search
CPC .................................................... B64D 47/06
USPC ........................................................ 340/981
See application file for complete search history.

(56) References Cited

U.S. PATENT DOCUMENTS

| | | | |
|---|---|---|---|
| 3,706,968 A * | 12/1972 | Turner, Jr. ............. | B64D 47/06 340/815.67 |
| 6,296,378 B1 * | 10/2001 | Doyen .................... | B64C 27/52 362/390 |
| 6,963,293 B1 * | 11/2005 | Rast ....................... | B64D 47/04 340/958 |
| 8,454,212 B2 * | 6/2013 | Fabbri .................... | B64D 47/06 340/981 |
| 8,956,023 B1 | 2/2015 | Hessling Von Heimendahl et al. | |
| 2008/0137353 A1 * | 6/2008 | Larsen ................... | B64D 47/04 362/470 |
| 2016/0046390 A1 | 2/2016 | Von Heimendahl et al. | |

FOREIGN PATENT DOCUMENTS

| | | |
|---|---|---|
| EP | 2985227 A1 | 2/2016 |
| EP | 3002221 A1 | 4/2016 |

OTHER PUBLICATIONS

Extended European Search Report for International Application No. 16185045.8 dated Feb. 22, 2017, 8 pages.

* cited by examiner

*Primary Examiner* — Qutbuddin Ghulamali
(74) *Attorney, Agent, or Firm* — Cantor Colburn LLP

(57) ABSTRACT

An exterior airplane light unit includes a housing and a lens cover, the housing and the lens cover being shaped to embed the exterior airplane light unit into a side portion of a fuselage of an airplane in front of a wing root section of the airplane, with the lens cover blending into the side portion of the fuselage of the airplane, and at least one light source and at least one optical system, with the at least one light source and the at least one optical system being arranged between the housing and the lens cover and being arranged to direct a warning light output towards an engine of the airplane.

14 Claims, 6 Drawing Sheets

EXTERIOR AIRPLANE LIGHT UNIT AND METHOD OF WARNING GROUND PERSONNEL

FOREIGN PRIORITY

This application claims priority to European Patent Application No. 16185045.8 filed Aug. 19, 2016, the entire contents of which is incorporated herein by reference.

TECHNICAL FIELD

The present invention is in the field of exterior airplane lighting. In particular, the present invention is in the field of airplane-mounted warning lights.

Almost all airplanes have exterior lights. On the one hand, exterior airplane lights are provided for active visibility, i.e. in order for the pilot and/or the crew to better see the surroundings of the aircraft. Examples of such lights are landing lights, taxiing lights, and runway turn-off lights. On the other hand, exterior airplane lights are provided for passive visibility, i.e. in order for others to see the airplane better. Examples of such lights are navigation lights, also referred to as position lights, and anti-collision lights. The anti-collision light system of an airplane is commonly comprised of two sub-systems. On the one hand, airplanes commonly have white flashing anti-collision lights, also referred to as white strobe lights. These white strobe lights have a high light intensity and are primarily provided for achieving a long-range attention to the airplane, in particular in bad weather situations and/or at night. On the other hand, airplanes commonly comprise red flashing lights, which have a lower light intensity. These red flashing lights are turned on just before the engines are started and they remain active until the last engine is shut down. These red flashing lights help to serve as a safety warning to ground personnel that the engines are operational. As these lights, mounted to the top and bottom of the airplane fuselage, are rotating or flashing in any particular direction from the aircraft, these light units are often referred to as beacon lights units. In analogy, all red flashing lights of an airplane are often referred to as beacon lights. Accordingly, the entirety of the red flashing lights of an airplane is commonly referred to as the beacon light system. Despite safety being given large attention in the air travel field, new lighting systems may be beneficial.

Accordingly, it would be beneficial to provide exterior airplane lighting that improves the operating safety at airports. Further, it would beneficial to provide improved warning to ground personnel at airports.

SUMMARY

Exemplary embodiments of the invention include an exterior airplane light unit that comprises a housing and a lens cover, the housing and the lens cover being shaped to embed the exterior airplane light unit into a side portion of a fuselage of an airplane in front of a wing root section of the airplane, with the lens cover blending into the side portion of the fuselage of the airplane, and at least one light source and at least one optical system, with the at least one light source and the at least one optical system being arranged between the housing and the lens cover and being arranged to direct a warning light output towards an engine of the airplane, wherein the warning light output, provided by the at least one light source and the at least one optical system, comprises a sequence of red light flashes for alerting ground personnel in front of the engine of the airplane.

Exemplary embodiments of the invention allow for a reliable warning of ground personal in front of the engine of an airplane. In particular, ground personnel working on an airplane in preparation for an upcoming flight, such as ground personnel performing cargo loading, maintenance, and safety checks, can be reliably made aware that they should leave the area in front of the engine of the airplane. The use of red light flashes is an efficient way of warning ground personnel, as red light flashes are commonly used for signalling running engines of airplanes. Further, directing red light flashes to an area in front of the engine of an airplane is a great improvement in airport safety for two reasons. First, with prior art beacon light systems, which employ red flashing lights on the top of the aircraft fuselage and on the bottom of the airplane fuselage or which comprise wing-tip-mounted and tail-mounted light units, the area in front of the engines of an airplane may be blocked with respect to these red flashing lights by the engines of the airplane. The provision of a red flashing light unit at a side portion of the fuselage of the airplane and the emission of red light flashes towards the engine of the airplane allow for red flashes to be also readily visible in the area in front of the engines. In this way, the area receiving effective warning light output is increased. Second, the area in front of the engines particularly dangerous for ground personnel, because the ground personnel is most exposed to the dangerous sucking effect of running engines. By providing red light flashes in exactly that area, the work safety of ground personnel is greatly improved right where that work is most dangerous.

The exterior airplane light unit may have a control unit that is configured to control the at least one light source to emit light flashes for alerting ground personnel. In particular, the control unit may be coupled to a board computer of the airplane and may be configured to receive an engine operation signal. On the basis of this engine operation signal, which may indicate if the engines of the airplane are running or not, the control unit may be configured to control the exterior airplane light unit to emit a sequence of red light flashes whenever the engines of the airplane are running. In this way, the exterior airplane light unit forms part of the beacon light system of the airplane, which signals to the ground personnel that the engines of a particular airplane are running.

According to a further embodiment, the exterior airplane light unit may comprise exactly one light source and exactly one optical system for outputting the sequence of red light flashes. However, it is also possible that a plurality of light sources and a plurality of optical systems are provided for emitting the sequence of red light flashes. In particular, each light source may be provided with an associated optical system for shaping the output light intensity distribution of the warning light output of the exterior airplane light unit. The optical system may transform the light output, as emitted by the associated light source, into an output light intensity distribution suitable for the light flashes for alerting ground personnel in front of the engine of the airplane. The transformation of the light output may be achieved by the optical system alone or jointly by the optical system and the lens cover. The optical system may be a lens or a reflector. It may also comprise two or more optical elements. In particular, the optical system may be a combination of one or more lenses and/or one or more reflectors and/or one or more shutters.

According to a further embodiment, the at least one light source is at least one LED. Providing the red light flashes by one or more LEDs allows for a compact, energy-efficient, and reliable implementation of the exterior airplane light unit.

The lens cover blends into the side portion of the fuselage of the airplane. In other words, the lens cover is flush with the side portion of the fuselage of the airplane, where the exterior airplane light unit is positioned. In yet other words, the outer contour of the lens cover is a continuation of the outer contour of the side portion of the fuselage of the airplane. In this way, the exterior airplane light unit can perform its warning function to ground personnel, without having a negative impact on the aerodynamics of the airplane.

According to a further embodiment, the sequence of red light flashes is a sequence of light flashes of aviation red color. The color aviation red is commonly used for the beacon light systems of airplanes. In this way, the red light flashes are immediately perceived as part of the warning function of the beacon light system of the airplane.

According to a further embodiment, the at least one light source is at least one red light source, in particular at least one red LED. In other words, the light source or light sources inherently emit light of red color. In this way, the optical system and lens cover can pass on the red light in an unaltered manner, with red light flashes being output by the exterior airplane light unit.

According to a further embodiment, the at least one optical system comprises a red light filter. In other words, the at least one optical system comprises a filter adapted to filter out all light except for red light. In this way, light sources emitting a combination of colors, such as white LEDs or other white light sources, can be conveniently used for the exterior airplane light unit.

According to a further embodiment, the warning light output has an opening angle of between 50° and 85°, in particular of between 60° and 80°, in a first cross-sectional plane. The first cross-sectional plane may be a vertical cross-sectional plane. In this way, a wide-angle output light intensity distribution may be emitted by the exterior airplane light unit, which is well-suited to warn ground personnel at different distances from the fuselage and in different body positions, such as standing upright or kneeling on the floor. In particular, this wide-angle distribution is well-suited for reliably warning ground personnel despite the short distance between the side portion of the fuselage of the airplane and the area in front of the engine of the airplane.

According to a further embodiment, the warning light output has an opening angle of between 10° and 60°, in particular of between 10° and 40°, further in particular of between 20° and 30° in a second cross-sectional plane. The second cross-sectional plane may be a plane angled downwards from the location of the exterior airplane light unit towards the engine of the airplane. In particular, the second cross-sectional plane may be a plane that runs through a horizontal line along the fuselage of the airplane and that also runs through the center of the engine in question. It is also possible that the second cross-section plane is a horizontal plane to which the warning light output is projected in a vertical manner.

According to a further embodiment, the warning light output has a peak light intensity of at least 200 cd. In this way, a strong warning signal can be emitted to the ground personnel, which can hardly be overlooked.

According to a further embodiment, the exterior airplane light unit is a combined wing scan and warning light unit, wherein said at least one light source is at least one warning light source and said at least one optical system is at least one warning light optical system and wherein the exterior airplane light unit further comprises at least one wing scan light source and at least one swing scan optical system, with the at least one wing scan light source and the at least one wing scan optical system being arranged to direct to a continuous wing scan light output towards a wing region of the airplane. In this way, above described functionality of alerting ground personnel in front of the engine of an airplane with a sequence of red light flashes may be combined with the wing scan functionality, which may be used by pilots and/or crew for checking the wing for ice build-up during flight. By combining these two functionalities into a single exterior airplane light unit, above described alert functionality for ground personnel can be implemented with low additional complexity and weight, as compared to exterior aircraft lighting systems that already have a wing scan light unit. All of or any subset of the at least one warning light source and the at least one wing scan light source may be LEDs. In particular, the at least one warning light source may be at least one warning light LED and/or the at least one wing scan light source may be at least one wing scan LED.

According to further embodiment, the at least one wing scan light source and the at least one wing scan optical system are arranged to direct a continuous wing scan light output towards a leading wing edge of the airplane and/or towards a front portion of the engine of the airplane. In this way, one or both of the leading wing edge of the airplane and the front portion of the engine of the airplane can be checked for ice build-up in a targeted manner. In particular, the three functionalities of alerting ground personnel via red light flashes, of checking the leading wing edge of the airplane, and of checking the front portion of the engine of the airplane can be combined into a single exterior airplane light unit.

According to a further embodiment, the exterior airplane light unit is a combined cargo and warning light unit, wherein said at least one light source is at least one warning light source and said at least one optical system is at least one warning light optical system and wherein the exterior airplane light unit further comprises at least one cargo light source and at least one cargo optical system, with the at least one cargo light source and the at least one cargo optical system being arranged to direct a continuous cargo light output towards a cargo loading region besides the airplane. In this way, above described functionality of alerting ground personnel with a sequence of red light flashes can be combined with illuminating the cargo loading region beside the airplane in a single exterior airplane light unit. In particular, the at least one cargo light source and the at least one cargo optical system may be arranged to provide illumination for cargo loading and cargo unloading, in particular for illuminating a cargo conveyor belt, to which and from which cargo is loaded/unloaded. In this way, the additional functionality of alerting ground personnel via a sequence of red flashes can be implemented with low additional complexity and weight, as compared to exterior aircraft lighting systems that already have a cargo light unit. All of or any subset of the at least one warning light source and the at least one cargo light source may be LEDs. In particular, the at least one warning light source may be at least one warning light LED and/or the at least one cargo light source may be at least one cargo LED.

Exemplary embodiments of the invention further include an airplane comprising at least one exterior airplane light unit, as described in any of the embodiments above, the at least one exterior airplane light unit being embedded into the side portion of the fuselage of the airplane. The modifications, additional features and effects, as described above with respect to the exterior airplane light unit, apply to the airplane in an analagous manner.

In a particular embodiment, the airplane may have a first exterior airplane light unit and a second exterior airplane light unit, the first and second exterior airplane light units being in accordance with any of the embodiments described above, wherein the first exterior airplane light unit is embedded into a left side portion of the fuselage of the airplane for alerting ground personnel in front of the left engine of the airplane and with the second exterior airplane light unit being embedded into a right side portion of the fuselage of the airplane for alerting ground personnel in front the right engine of the airplane.

According to a further embodiment, said at least one exterior airplane light unit is positioned in the side portion of the fuselage of the airplane at a distance of between 30% and 70%, in particular of between 40% and 60%, between a nose portion of the airplane and the wing root section of the airplane.

According to a further embodiment, the airplane comprises a beacon light system for emitting warning flashes of red light, the beacon light system comprising an upper flashing beacon light mounted to a top portion of the fuselage of the airplane for emitting warning flashes into an upper hemisphere, a lower flashing beacon light, mounted to a bottom portion of the fuselage of the airplane for emitting warning flashes into a lower hemisphere, and said at least one exterior airplane light unit embedded into the side portion of the fuselage of the airplane. In particular, the lower flashing beacon light may be arranged at the bottom of the fuselage of the airplane between the wing root section of the airplane and a tail portion of the airplane. In particular, the airplane may comprise two exterior airplane light units disposed in the left side portion of the fuselage of the airplane and the right side portion of the fuselage of the airplane, respectively. In this way, the exterior airplane light unit disposed in the side portion of the fuselage of the airplane may provide warning flashes in the area in front of the engine of the airplane, which is blocked from receiving light from the lower flashing beacon light by the engine.

According to a further embodiment, said at least one exterior airplane light unit may be synchronised with at least the lower flashing beacon light. In this way, the total number of flashes perceived in a certain viewing direction can be kept below a desired/required maximum number of flashes.

According to a further embodiment, the airplane comprises a beacon light system for emitting warning flashes of red light, the beacon light system comprising a left wing tip beacon light, mounted to a left wing tip portion of a left wing of the airplane, for emitting warning flashes into a left front portion of the environment of the airplane, a right wing tip beacon light, mounted to a right wing tip portion of a right wing of the airplane, for emitting warning flashes into a right front portion of the environment of the airplane, a tail beacon light, mounted to a tail portion of the airplane for emitting warning flashes into a back portion of the environment of the airplane, and said at least one exterior airplane light unit embedded into the side portion of the fuselage of the airplane. In particular, the airplane may comprise two exterior airplane light units disposed in the left side portion of the fuselage of the airplane and the right side portion of the fuselage of the airplane, respectively. In this way, the one or more exterior airplane light units, emitting red light flashes from the side portion(s) of the fuselage of the airplane, provide warning functionality to ground personnel in the dangerous area in front of the engine(s) of the airplane, where the distributed beacon light system, as described above, does not reach. For a more detailed description of this distributed beacon light system, comprising a right wing tip beacon light, a left wing tip beacon light, and a tail beacon light, reference is made to European patent application 14 180 958.2, the contents of which is incorporated herein by reference in its entirety.

In a particular embodiment, the airplane having the right wing tip beacon light, the left wing tip beacon light, and the tail beacon light, may additionally have a bottom beacon light, mounted to the bottom of the fuselage of the aircraft, for providing a sequence of red warning flashes below the airplane. Also in such configuration, because the light from the bottom beacon light may be locked from reaching the area in front of the engine of the airplane, providing one or more exterior airplane light units embedded into the side portion(s) of the fuselage of the airplane allows for reaching above described effects. Such an additional fuselage-bottom-mounted beacon light, to be used with the distributed beacon light system described above, is described in detail in European patent application 14 187 524.5, the contents of which is incorporated herein by reference in it entirety.

Exemplary embodiments of the invention further include a method of warning ground personnel in front of an engine of an airplane, comprising the step of emitting a sequence of red light flashes from a side portion of a fuselage of the airplane towards the engine of the airplane. The modifications, additional features and effects, described above with respect to the exterior airplane light unit, apply to the method of warning ground personnel in an analagous manner.

According to a further embodiment, the method further comprises the step of receiving an engine operation signal form a board computer of the airplane and emitting the sequence of red light flashes, if the engine operation signal indicates a running of the engines of the airplane.

BRIEF DESCRIPTION OF THE FIGURES

Further exemplary embodiments of the invention are described with respect to the accompanying drawings, wherein.

DETAILED DESCRIPTION

Figure 1:
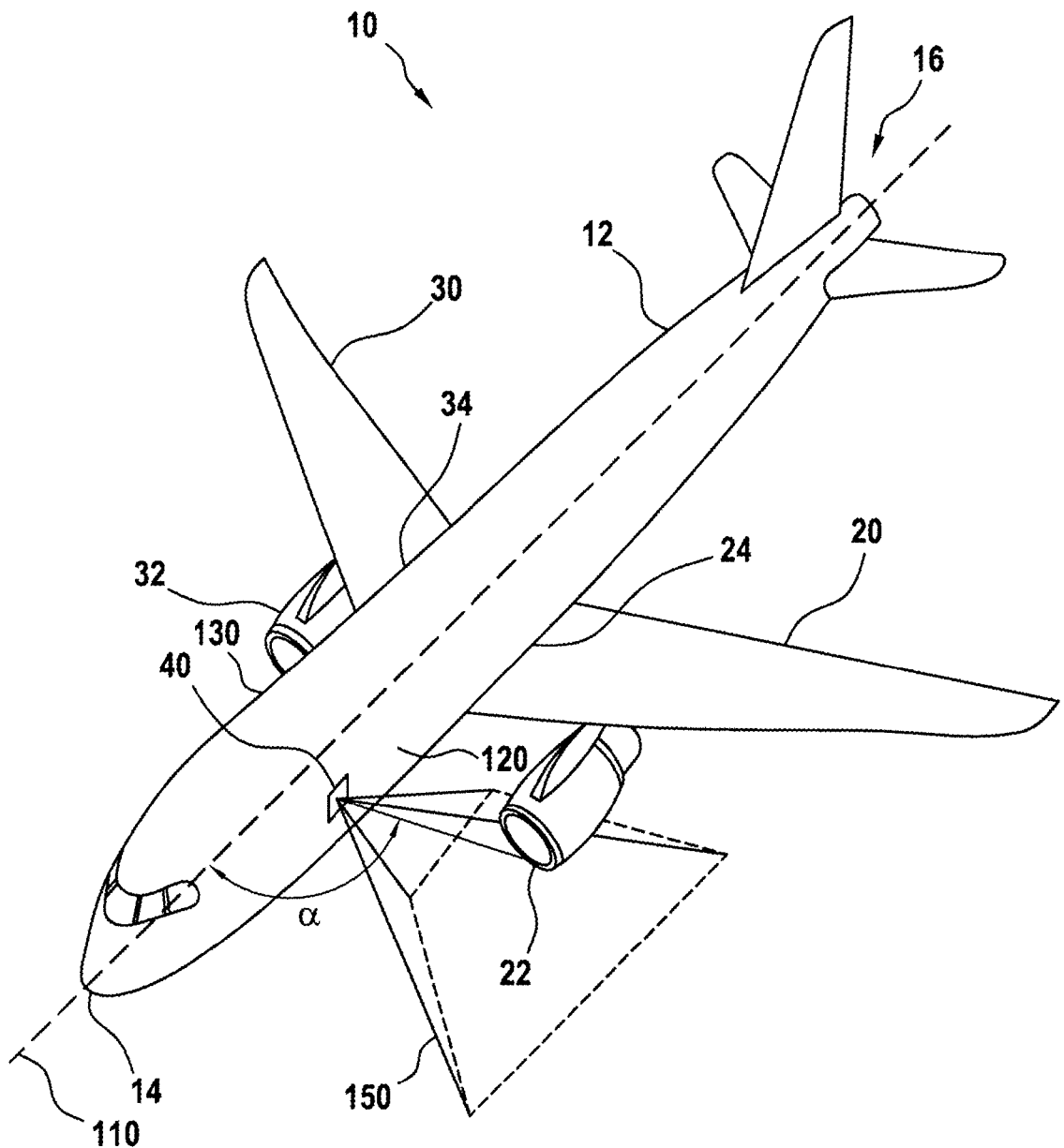
FIG. 1 shows an airplane in accordance with an exemplary embodiment of the invention in a schematic perspective view, the airplane being equipped with an exterior airplane light unit in accordance with an exemplary embodiment of the invention.

FIG. 1 shows an airplane 10 in a perspective view in accordance with an exemplary embodiment of the invention. The airplane 10 has a fuselage 12, extending from a nose portion 14 of the airplane to a tail portion 16 of the airplane. The fuselage 120 has a left side portion 120 and a right side portion 130. Attached to the fuselage 12, there are provided a left wing 20 and a right wing 30. The airplane 10 has a left wing root section 24, where the left wing 20 is mounted to the fuselage 12. The airplane 10 further has a right wing root section 34, where the right wing 30 is mounted to the fuselage 12. The left wing 20 carries a left engine 22, while the right wing 30 carries a right engine 32. The left and right engines 22 and 32 are commonly gas turbine engines, but the invention is not restricted thereto. The left and right wings 20 and 30 have an airfoil section, extending between the fuselage 12 and the respective wing tips, with the airfoil sections providing for the lift of the airplane in operation.

The airplane 10 further comprises two exterior airplane light units for illuminating an area in front of the left and right engines 22, 32 of the airplane 10, respectively, with the exterior airplane light units being in accordance with exemplary embodiments of the invention. The left one of these exterior airplane light units is shown in the perspective view of FIG. 1 and is denoted with reference numeral 40. In particular, the exterior airplane light unit 40 is provided for alerting ground personnel in front of the left engine 22 of the airplane 10, when the airplane 10 is on the ground. The exterior airplane light unit 40 is arranged in the left side portion 120 of the fuselage 12 between the nose portion 14 of the airplane 10 and the left wing root section 24 of the airplane 10. It is arranged substantially in the middle between the nose portion 14 and the center of the left wing root section 24. Besides being provided for alerting ground personnel in front of the left engine 22, the exterior airplane light unit 40 is provided for illuminating the left engine 22 and the left wing 20, in particular a front edge of the left wing 20. This illumination may be used for checking the left engine 22 and the left wing 20 for structural integrity and/or ice build-up during flight. The exterior airplane light unit 40 is a combined wing scan and warning light unit.

As will be explained below with reference to FIG. 2, the exterior airplane light unit 40 has dedicated LEDs and optical systems for illuminating the engine 22, the wing 20, and the area in front of the engine 22. The illumination of the area in front of the engine 22 is illustrated by a cone 150 in FIG. 1. The cone 150 is also generally referred to as the warning light output 150 of the exterior airplane light unit 40. It is understood that an analogous exterior airplane light unit is provided in the right side portion 130 of the fuselage 12 of the airplane 10. This right exterior airplane light unit is adapted to illuminate the right engine 32, the right wing 30, and the area in front of the right engine 32.

The connection line between the exterior airplane light unit 40 and the left engine 22 has an angle α with the respect to a rear-to-front direction 110 of the airplane 10. This angle α is about 110° and is an indication of where the illumination for alerting ground personnel in front of the engine 22 is emitted. In particular, the cone 150, illustrating the illumination by the exterior airplane light unit 40 for alerting ground personnel, is arranged around this angle α.

Figure 2:
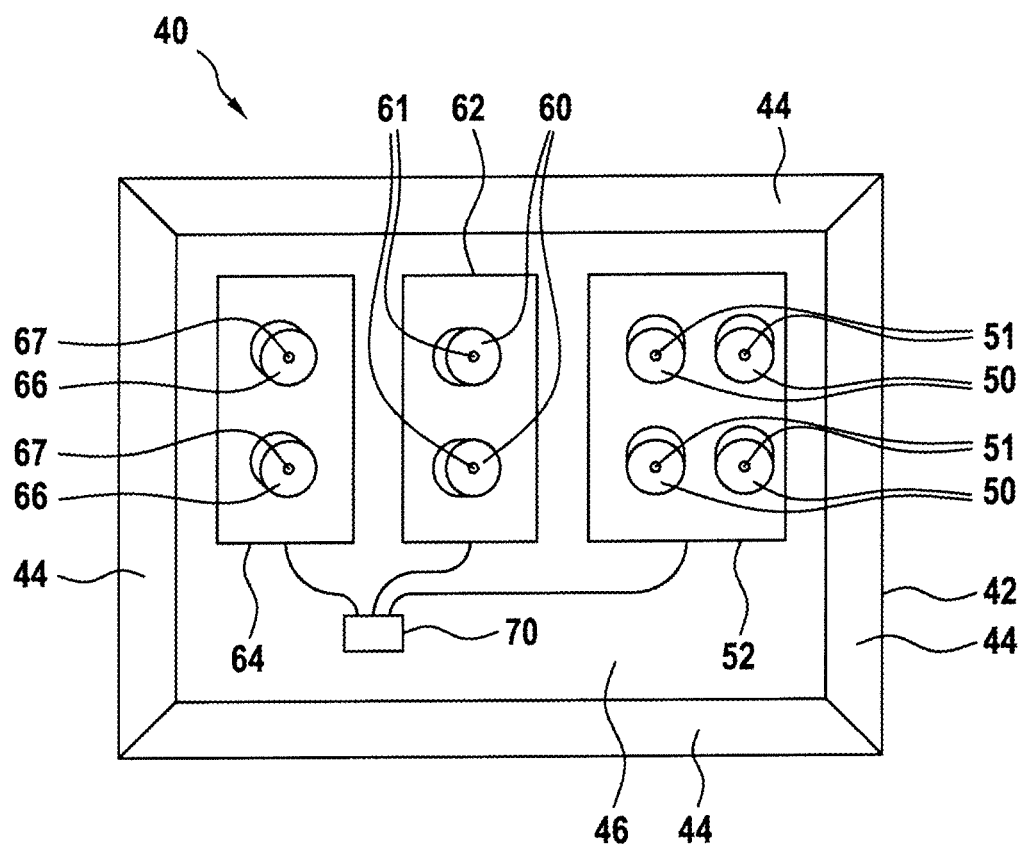
FIG. 2 shows a schematic diagram of the exterior airplane light unit of FIG. 1 in a front view.

FIG. 2 shows a schematic diagram of an exterior airplane light unit 40 in accordance with an exemplary embodiment of the invention. This exterior airplane light unit 40 may be disposed in the airplane 10 of FIG. 1, as depicted in FIG. 1. The exterior airplane light unit 40 is shown in a front view in FIG. 2, with the front view corresponding to a viewing direction from the left side towards the airplane 10 of FIG. 1.

The exterior airplane light unit 40 comprises a housing 42. The housing is covered by a transparent lens cover, which is not shown in FIG. 2, for closing the exterior airplane light unit 40. The housing 42 has a back wall 46 and four side walls 44. The housing 42 has a generally cubic structure. Various LEDs and optical systems, as will be described below, and a control unit 70 for controlling the various LEDs are arranged inside the housing 42.

Four warning light LEDs 51 and four associated warning light optical systems 50, which are four lenses 50 in the exemplary embodiment of FIG. 2, are provided on a first mounting structure 52. The warning light LEDs 51 are red LEDs. The four combinations of a respective warning light LED 51 and a respective warning light optical system 50 are angled downwards and slightly towards the rear. Their direction is aimed at the ground area generally in front of the left engine of the airplane.

Further, two wing edge scan LEDs 61 and two associated wing edge scan optical systems 60, which are two lenses 60 in the exemplary embodiment of FIG. 2, are provided on a second mounting structure 62. The wing edge scan LEDs 61 are white LEDs. The two combinations of a respective wing edge scan LED 61 and a respective warning light optical system 60 are angled towards the rear. Their direction is aimed at the wing edge of the left wing of the airplane.

Yet further, two engine scan LEDs 67 and two associated engine scan optical systems 66, which are two lenses 66 in the exemplary embodiment of FIG. 2, are provided on a third mounting structure 64. The engine scan LEDs 67 are white LEDs. The two combinations of a respective engine scan LED 67 and a respective engine scan optical system 66 are angled towards the rear and downwards. Their direction is aimed at the front portion of the left engine of the airplane.

The wing edge scan LEDs 61 and the engine scan LEDs 67 may also jointly be referred to as wing scan LEDs. Analogously, the wing edge scan optical systems 60 and the engine scan optical systems 66 may also jointly be referred to as wing scan optical systems.

While the respective combinations of LEDs and optical systems, in the present case lenses, are mechanically angled in the general direction of the intended illumination, the particular implementations of the optical systems provide for the resulting output light intensity distributions of the exterior airplane light unit. The light output resulting from the operation of the various LEDs will be described in detail with respect to FIG. 4. Given the arrangement of the LEDs and optical systems, the skilled person is able to provide suitable optical systems for reaching desired output light intensity distributions.

The exterior airplane light unit 40 further comprises a control unit 70 that is connected to the warning light LEDs 51, to the wing edge scan LEDs 61, and to the engine scan LEDs 67 via the first to third mounting structures 52, 62 and 64. The control unit 70 is adapted to selectively switch the LEDs on and off. In particular, the control unit is adapted to turn the warning light LEDs 51 periodically on and off, thus controlling the warning light LEDs to emit a warning light output in the form of a sequence of red light flashes. Further in particular, the control unit is adapted to turn the wing edge scan LEDs 61 and the engine scan LEDs 67 on for emitting a continuous illumination of the wing edge and the front portion of the engine. The control unit 70 may be coupled to a board computer, with the board computer passing on respective commands from the pilots and/or crew for illumination of the wing edge and/or for illumination of the front portion of the engine and/or for emitting the warning light output into the area in front of the engine. It is also possible that the control unit, as a response to a suitable signal from the board computer, controls the warning light LEDs 51 to emit a sequence of red light flashes automatically in response to the engine running, i.e. without pilot/crew interaction.

The control unit may be able to control the warning light LEDs 51, the wing edge scan LEDs 61, and the engine scan LEDs 67 separately, thus controlling above described three functionalities independently from each other. This provides for a flexible controlling of the LEDs and may also ensure to keep the dissipated power within pre-set power limits. For example, it is possible that the control unit 70 only operates the warning light LEDs 51 on the ground, while it operates the wing edge scan LEDs 61 and the engine scan LEDs 67 only during flight, with the exception of test operations. In this way, the power requirements for the exterior airplane light unit 40 can be kept low.

Figure 3:
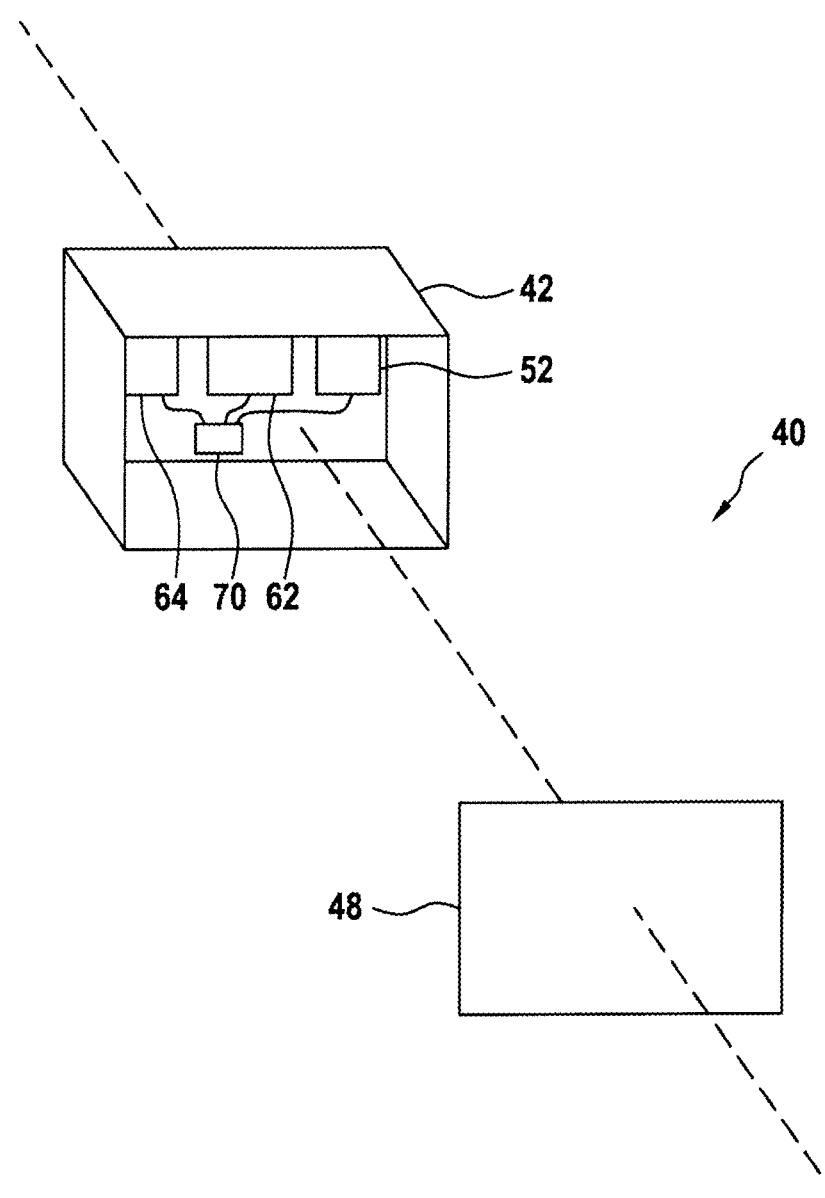
FIG. 3 shows the exterior airplane light unit of FIG. 2 in an exploded, perspective view.

FIG. 3 shows the exterior airplane light unit 40 of FIG. 2 in an exploded, perspective view. In particular, the housing 42, having the control unit 70 and the first to third mounting structures 52, 62 and 64 contained therein, is shown separated from the lens cover 48, which is not shown in FIG. 2. The lens cover 48 is transparent and passes the light from the LEDs therethrough. The lens cover 48 blends into the side portion of the fuselage of the airplane. In FIG. 3, the lens cover 48 is shown as a substantially planar structure, blending into a substantially planar portion of the side portion of the fuselage of the airplane. It is also possible that the lens cover 48 is curved, blending into a curved portion of the side portion of the fuselage of the airplane. Also, the housing 42 may have different shapes, as compared to the generally cuboid shape depicted in FIGS. 2 and 3. In this way, the exterior airplane light unit 40 may be adapted to the available space in the side portion of the fuselage of the airplane.

Figure 4:
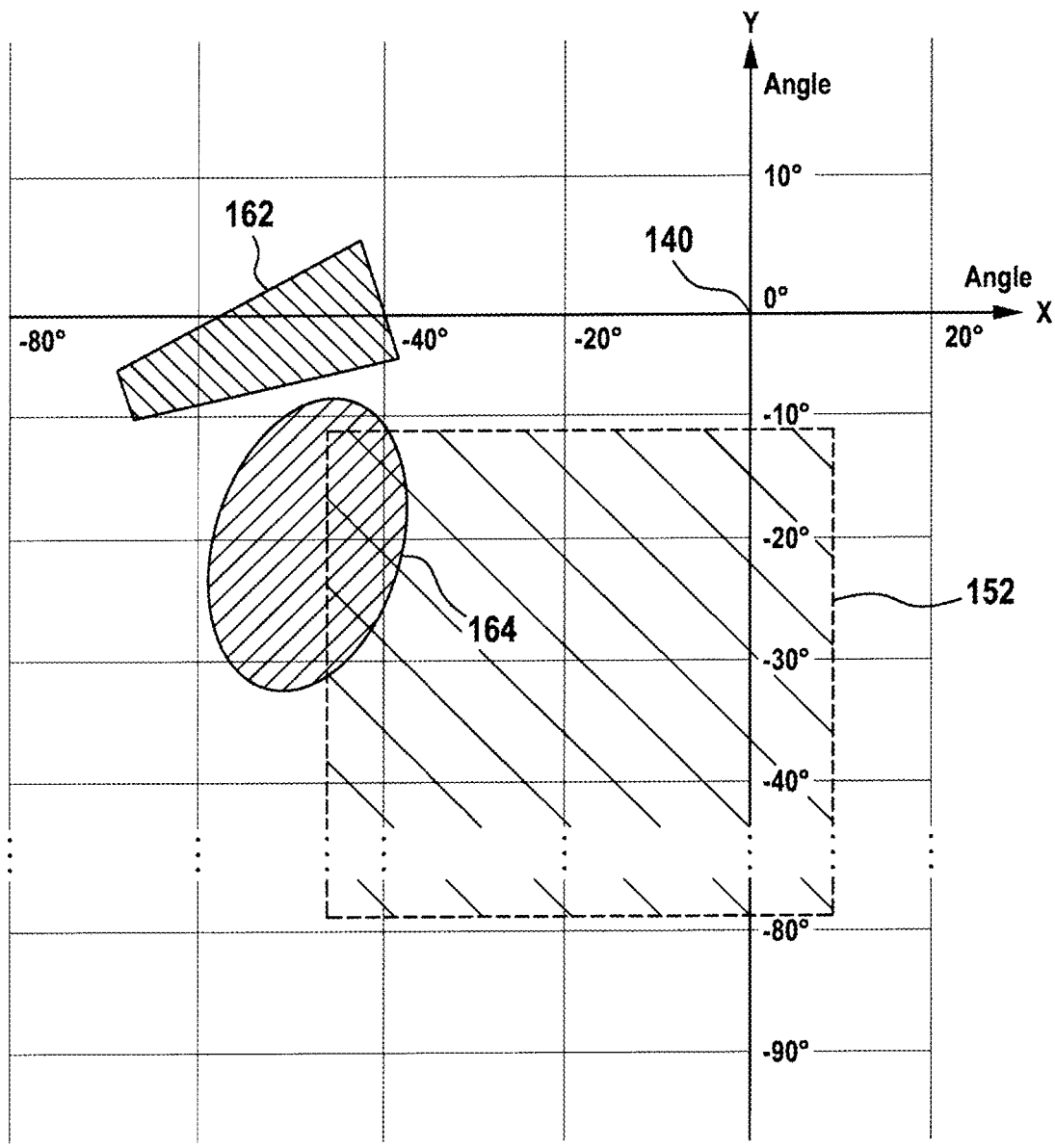
FIG. 4 shows an illumination distribution of the exterior airplane light unit of FIG. 1.

FIG. 4 shows an illumination distribution of the exterior airplane light unit 40 of FIGS. 2 and 3. In particular, a first illumination region 152 for illuminating the area in front of the engine of the airplane, caused by the warning light LEDs 51, is shown. Further, a second illumination region 162 for illuminating the wing edge of the airplane, caused by the wing edge scan LEDs 61, is shown. Yet further, a third illumination region 164 for illuminating the front portion of the engine, caused by the engine scan LEDs 67, is shown. These illumination regions 152, 162 and 164 are illustrated in terms of their respective angles with respect to a reference light emission direction 140. The reference light emission direction 140, which extends into the drawing plane at the intersection of the two axes shown, is horizontal and has a 90° angle with respect to the front-rear direction of the airplane in the present embodiment. In other words, the reference light emission direction 140 is a straight transverse direction of the airplane.

If the exterior airplane light unit 40 is disposed at the broadest position of the fuselage 12, the reference light emission direction may be normal to the lens cover 48 of the exterior airplane light unit 40. However, the reference light emission direction may also be at an angle with respect to the lens cover 48. It is pointed out that the reference light emission direction is a question of definition and does not necessarily have an underlying meaning with respect to the light unit and/or airplane framework.

The x-axis of FIG. 4 denotes the front-rear angle of the illumination regions with respect to the reference light emission direction 140, with negative values denoting angles towards the rear. In other words, the x-axis is a cross-section of a horizontal reference plane. The y-axis illustrates the top-bottom angle of the illumination regions with respect to the reference light emission direction 140, with negative values denoting angles towards the bottom. In other words, the y-axis is a cross-section of a vertical reference plane.

The first illumination region 152 extends approximately between 10° towards the front and 50° towards the rear and approximately between 10° and 80° towards the bottom. In this way, a warning light output with a comparably wide angle is provided for alerting ground personnel straight in front of and around the front of the engine of the airplane. The second illumination region 162 extends approximately between 35° and 70° towards the rear and approximately between 5° to the top and 10° towards the bottom, thus illuminating the wing edge of the wing at least substantially along its entire extension. The third illumination region 164 extends approximately between 35° and 60° towards the rear and 5° and 35° towards the bottom, thus illuminating the front portion of the engine.

It is pointed out that the edges of the illumination regions 152, 162 and 164 of FIG. 4 do not require zero light emission to their outside. The edges represent a borderline where the illumination drops to a threshold value with respect to the point of highest light intensity within the respective illumination regions. This threshold may for example be 5% of the highest light intensity within the respective illumination regions.

In the exemplary embodiment of FIGS. 2 to 4, the peak light intensity, as jointly emitted by the warning light LEDs 51, is 200 cd. It is, however, possible that other peak light intensities are emitted. Further, the light intensities of the wing edge scan LEDs 61 and the engine scan LEDs 67 may have a lower peak light intensity, as compared to the warning light LEDs 51.

It is pointed out that the numbers of LEDs, their arrangements, their light outputs, and their associated functions, as described with respect to FIGS. 2 to 4, are exemplary in nature. For example, the exterior airplane light unit 40 may be solely provided for the purpose of warning ground personnel in front of the engine of the airplane and may therefore only have one or more warning light LEDs 51. It is also possible that the exterior airplane light unit may by a combined cargo and warning light unit. Such an exterior airplane light unit may have warning light LEDs 51, associated with warning light optical systems 50, and cargo light LEDs, associated with cargo light optical systems. It is also possible that only one warning light LED 51 and only one warning light optical system 50 are provided. It is further possible that all LEDs are mounted on a joint mounting structure. Also, the LEDs and the associated optical systems may be densely packed for space efficiency. It is further possible that a particular subset or particular subsets of LEDs share one or more optical systems. Also, the one or more warning LEDs may be white LEDs, with the associated one or more warning light optical systems having a red filter for making the warning light output red. Also, the lens cover may have a red portion where the output of the warning light LEDs passes through. Further, other light sources than LEDs may be used.

Figure 5:
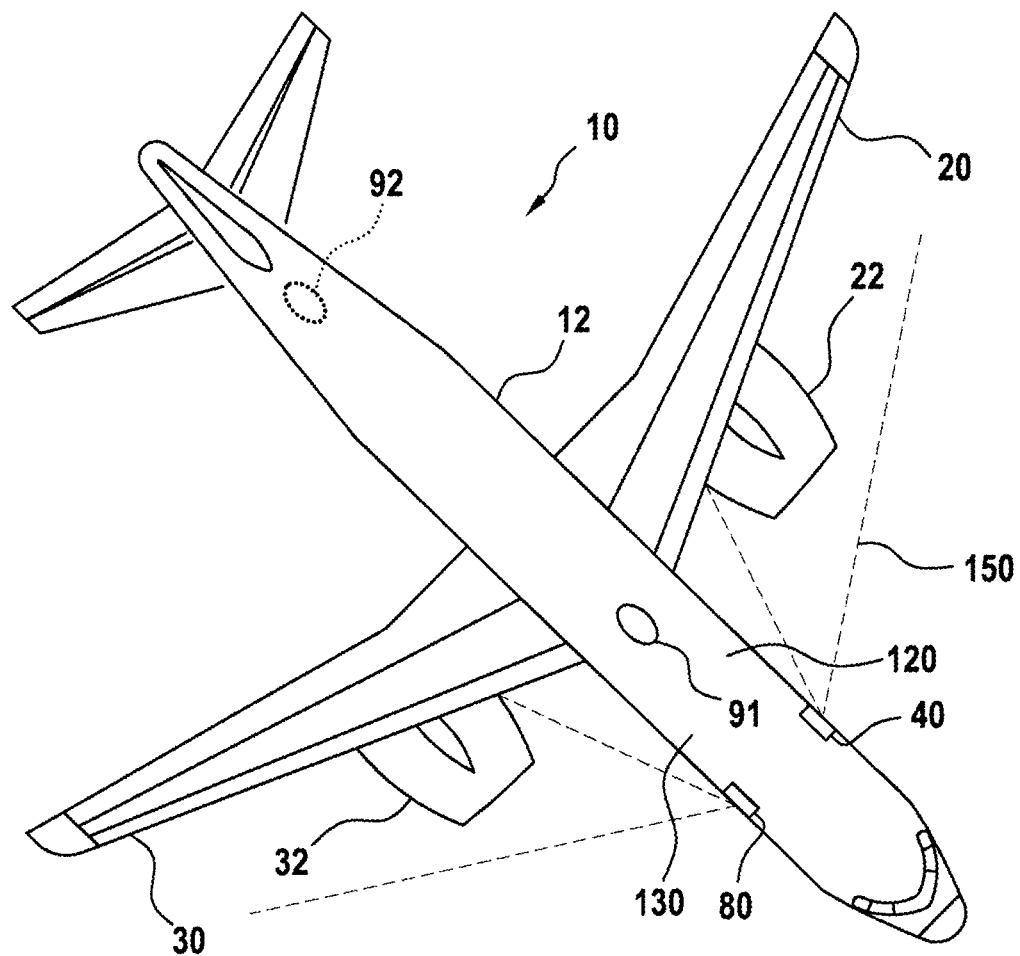
FIG. 5 shows an airplane in accordance with an exemplary embodiment of the invention in a top view, equipped with a beacon light system comprising an exterior airplane light unit in accordance with an exemplary embodiment of the invention.

FIG. 5 shows an airplane 10 in accordance with an exemplary embodiment of the invention. The airplane 10 is similar to the airplane of FIG. 1, with like elements having like reference numerals and not being described again. The airplane 10 is equipped with a beacon light system, emitting warning flashes of red light. In particular, the beacon light system is configured to emit warning flashes of red light in order to signal that the engines 22 and 32 of the airplane 10 are operating. The warning flashed of red light are emitted when on the ground for warning ground personnel, as well as during the take-off and landing phases of the flight.

The beacon light system of the airplane 10 has an upper flashing beacon light 91 and a lower flashing beacon light 92. The upper flashing beacon light 91 is mounted to the top of the fuselage 12 and emits warning flashes into an upper hemisphere in the airplane frame of reference. The lower flashing beacon light 92 is mounted to the bottom of the fuselage 12 (and is therefore depicted in phantom lines) and emits warning flashes into a lower hemisphere in the airplane frame of reference. Both the upper flashing beacon light 91 and the lower flashing beacon light 92 emit red light in a revolving manner, which is perceived as a sequence of red flashes in any given direction. The beacon light system further comprises a left exterior airplane light unit 40, for emitting a warning output in the form of red light flashes towards a region in front of and around the left engine 22, and a right exterior airplane light unit 80, for emitting a warning output in the form of red light flashes towards a region in front of and around the right engine 32.

Ground personnel, when standing or kneeling on the ground below or around the airplane 10, is warned with respect to the engines being operative by the lower flashing beacon light 92 in most directions. However, in areas in front of the left engine 22 and the right engine 32, the light from the lower flashing beacon light 92 is blocked by the left engine 22 and the right engine 32, respectively. The left and right exterior airplane light units 40, 80 achieve an illumination with red light flashes in the areas in front of the left and right engines 22, 32, thus ensuring a warning of ground personnel in the very dangerous area in front of the engines.

As compared to the embodiment shown in FIGS. 1 to 4, the cone 150 of illumination with red light flashes is more narrow. It is pointed out that the cone 150 of illumination may have different angles and different forms, depending on the particular implementation.

Figure 6:
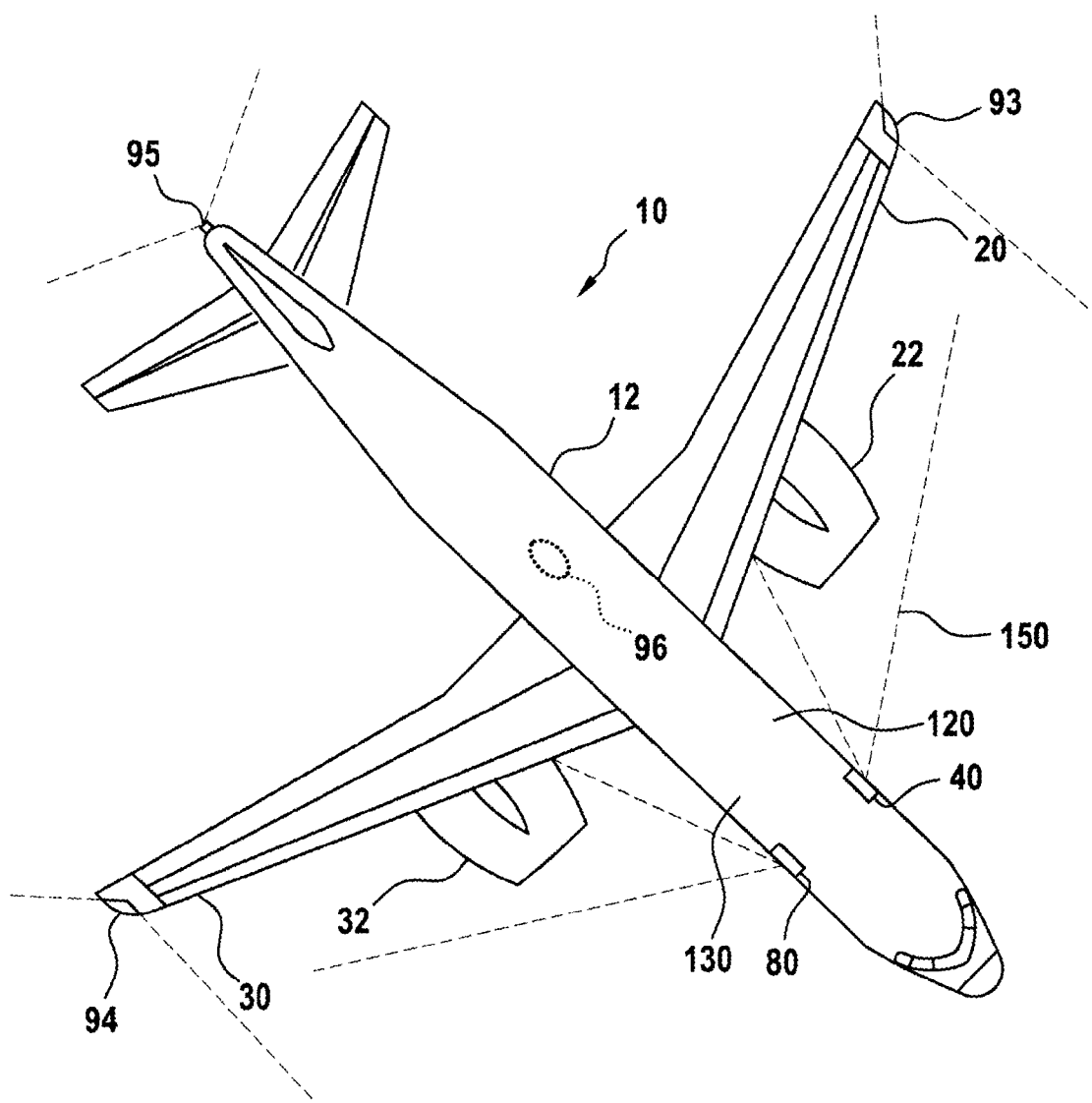
FIG. 6 shows an airplane in accordance with an exemplary embodiment of the invention in a top view, equipped with another beacon light system comprising an exterior airplane light unit in accordance with an exemplary embodiment of the invention.

FIG. 6 shows an airplane 10 in accordance with an exemplary embodiment of the invention, similar to the airplane 10 of FIG. 5, but equipped with another beacon light system. This other beacon light system comprises a left wing tip beacon light 93, a right wing tip beacon light 94, a tail beacon light 95, a left exterior airplane light unit 40, a right exterior airplane light unit 80, and—as an optional component—a bottom beacon light 96. The left wing tip beacon light 93, the right wing tip beacon light 94, the tail beacon light 95, the left exterior airplane light unit 40, and the right exterior airplane light unit 80 are configured to emit light flashes of red color. The bottom beacon light 96 is configured to emit a revolving light output of red light, which is perceived as a sequence of red flashes in any given viewing direction.

The left wing tip beacon light 93 is mounted to the wing tip of the left wing 20 of the airplane 10 and is configured to emit red flashes into the upper hemisphere and into the lower hemisphere within a left front portion of the environment of the airplane, in particular within an opening angle of about 125° between a straight forward direction and a left backwards direction. The right wing tip beacon light 94 is mounted to the wing tip of the right wing 30 of the airplane 10 and is configured to emit red flashes into the upper hemisphere and into the lower hemisphere within a right front portion of the environment of the airplane, in particular within an opening angle of about 125° between a straight forward direction and a right backwards direction. The tail beacon light 95 is mounted to the tail portion of the airplane 10 and is configured to emit red flashes into the upper hemisphere and into the lower hemisphere within a back portion of the environment of the airplane, in particular within an opening angle of about 110° around a straight backward direction. The bottom beacon light 96 is mounted to the bottom of the fuselage of the airplane 10 and is configured to emit red flashes in a 360° opening angle in the lower hemisphere. Such a distributed beacon light system is described in more detail in European patent applications EP 14 180 958.2 and EP 14 187 524.5, the entire contents of which is incorporated herein by reference.

Also with the beacon light system of FIG. 6, the exterior airplane light units 40 and 80 are able to alert ground personnel in front of the left and right engines 22, 32 of the airplane 10, where no light from the left and right wing tip beacon light units 93, 94 and no light from the tail beacon light unit 95 reaches. Also, the exterior airplane light units 40 and 80 ensure the provision of red light flashes in areas where light from the bottom beacon light 96 is blocked by the left and right engines 22, 32.

Both in the beacon light systems of FIG. 5 and FIG. 6, the left and right exterior airplane light units, emitting red light flashed for alerting ground personnel in front of the engines of the airplane, may be synchronized with the other bacon lights of the beacon light system.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. An exterior airplane light unit, comprising:
   a housing and a lens cover, the housing and the lens cover being shaped to embed the exterior airplane light unit into a side portion of a fuselage of an airplane in front of a wing root section of the airplane, with the lens cover blending into the side portion of the fuselage of the airplane; and
   at least one light source and at least one optical system, with the at least one light source and the at least one optical system being arranged between the housing and the lens cover and being arranged to direct a warning light output towards an engine of the airplane;

wherein the warning light output, provided by the at least one light source and the at least one optical system, comprises a sequence of red light flashes for alerting ground personnel in front of the engine of the airplane, wherein the lens cover has a substantially planar structure, blending into a substantially planar portion of the side portion of the fuselage of the airplane.

2. The exterior airplane light unit according to claim 1, wherein the sequence of red light flashes is a sequence of light flashes of aviation red color.

3. The exterior airplane light unit according to claim 1, wherein the at least one light source is at least one red light source, in particular at least one red LED.

4. The exterior airplane light unit according to claim 1, wherein the at least one optical system comprises a red light filter.

5. The exterior airplane light unit according to claim 1, wherein the warning light output has an opening angle of between 50° and 85° in a first cross-sectional plane and/or wherein the warning light output has an opening angle of between 10° and 60° in a second cross-sectional plane.

6. The exterior airplane light unit according to claim 5, wherein the first cross-sectional plane is a vertical cross-sectional plane.

7. The exterior airplane light unit according to claim 1, wherein the warning light output has a peak light intensity of at least 200 candellas.

8. The exterior airplane light unit according to claim 1, wherein the exterior airplane light unit is a combined wing scan and warning light unit, wherein said at least one light source is at least one warning light source and said at least one optical system is at least one warning light optical system, and wherein the exterior airplane light unit further comprises at least one wing scan light source and at least one wing scan optical system, with the at least one wing scan light source and the at least one wing scan optical system being arranged to direct a continuous wing scan light output towards a wing region of the airplane.

9. Exterior airplane light unit according to claim 8, wherein the at least one wing scan light source and the at least one wing scan optical system are arranged to direct a continuous wing scan light output towards a leading wing edge of the airplane and/or towards a front portion of the engine of the airplane.

10. The exterior airplane light unit according to claim 1, wherein the exterior airplane light unit is a combined cargo and warning light unit, wherein said at least one light source is at least one warning light source and said at least one optical system is at least one warning light optical system, and wherein the exterior airplane light unit further comprises at least one cargo light source and at least one cargo optical system, with the at least one cargo light source and the at least one cargo optical system being arranged to direct a continuous cargo light output towards a cargo loading region besides the airplane.

11. An airplane that includes a fuselage, the airplane comprising:

a first exterior airplane light embedded into a right side portion of the fuselage;

a second exterior airplane light embedded into a left side portion of the fuselage;

wherein the first and second exterior airplane lights both include:

a housing and a lens cover, the housing and the lens cover being shaped to embed the exterior airplane light unit into a side portion of a fuselage of an airplane in front of a wing root section of the airplane, with the lens cover blending into the side portion of the fuselage of the airplane; and at least one light source and at least one optical system, with the at least one light source and the at least one optical system being arranged between the housing and the lens cover and being arranged to direct a warning light output towards an engine of the airplane;

wherein the warning light output, provided by the at least one light source and the at least one optical system, comprises a sequence of red light flashes for alerting ground personnel in front of the engine of the airplane, wherein the lens cover has a substantially planar structure, blending into a substantially planar portion of the side portion of the fuselage of the airplane.

12. The airplane according to claim 11, wherein the first exterior airplane light is embedded into the right side portion of the fuselage of the airplane at a distance of between 30% and 70%, between a nose portion of the airplane and the wing root section of the airplane.

13. The airplane according to claim 11, comprising a beacon light system for emitting warning flashes of red light, the beacon light system comprising:

an upper flashing beacon light, mounted to a top portion of the fuselage of the airplane for emitting warning flashes into an upper hemisphere, a lower flashing beacon light, mounted to a bottom portion of the fuselage of the airplane for emitting warning flashes into a lower hemisphere, and said at least one exterior airplane light unit embedded into the side portion of the fuselage of the airplane.

14. The airplane according to claim 11, comprising a beacon light system for emitting warning flashes of red light, the beacon light system comprising:

a left wing tip beacon light, mounted to a left wing tip portion of a left wing of the airplane, for emitting warning flashes into a left front portion of the environment of the airplane, a right wing tip beacon light, mounted to a right wing tip portion of a right wing of the airplane, for emitting warning flashes into a right front portion of the environment of the airplane, a tail beacon light, mounted to a tail portion of the airplane, for emitting warning flashes into a back portion of the environment of the airplane, and said at least one exterior airplane light unit embedded into the side portion of the fuselage of the airplane.

* * * * *